(12) United States Patent
Maurice

(10) Patent No.: US 11,678,007 B2
(45) Date of Patent: Jun. 13, 2023

(54) SYSTEM FOR MANAGEMENT OF A PLURALITY OF RENDERING MACHINES TO AVOID TRANSMISSION FAILURES

(71) Applicant: ICHANNEL.IO LTD., Petah Tikva (IL)

(72) Inventor: Oren Jack Maurice, Yoqneam Moshava (IL)

(73) Assignee: ICHANNEL.IO LTD, Petah Tikva (IL)

( * ) Notice: Subject to any disclaimer, the term of this patent is extended or adjusted under 35 U.S.C. 154(b) by 0 days.

(21) Appl. No.: 17/159,821

(22) Filed: Jan. 27, 2021

(65) Prior Publication Data

US 2021/0152872 A1    May 20, 2021

Related U.S. Application Data

(63) Continuation of application No. PCT/IL2019/050862, filed on Jul. 31, 2019.

(60) Provisional application No. 62/712,991, filed on Aug. 1, 2018.

(51) Int. Cl.
*H04N 21/431* (2011.01)
*H04N 21/234* (2011.01)
*H04N 21/81* (2011.01)

(52) U.S. Cl.
CPC ..... *H04N 21/431* (2013.01); *H04N 21/23406* (2013.01); *H04N 21/8153* (2013.01)

(58) Field of Classification Search
CPC ........... H04N 21/431; H04N 21/23406; H04N 21/8153
See application file for complete search history.

(56) References Cited

U.S. PATENT DOCUMENTS

| | | | |
|---|---|---|---|
| 9,807,433 B2 | 10/2017 | Misumi | |
| 2004/0071088 A1* | 4/2004 | Curcio | H04L 65/1083 370/235 |
| 2007/0101379 A1* | 5/2007 | Pereira | H04N 21/2404 725/90 |

(Continued)

OTHER PUBLICATIONS

The International Search Report and The Written Opinion of the International Searching Authority for PCT/IL2019/050862, dated Nov. 21, 2019, ISA/IL, Jerusalem, Israel.

(Continued)

*Primary Examiner* — Kyu Chae
(74) *Attorney, Agent, or Firm* — M&B IP Analysts, LLC

(57) ABSTRACT

An edge server is served by a rendering machine supplying groups of pictures (GOPs) and comprises a buffer for a predetermined lead time over actual time. If a rendering machine fails then the partially available GOP from that rendering machine is discarded and another rendering machine, having the capacity to handle the GOPs stream, is activated. It provides GOPS from the failed GOP onwards and rendering continues therefrom by the replacing rendering machine. Rendering initially at a faster than real-time speed it is possible to catch-up on time so that the edge server continues to receive and transmit the GOPs without interruption. A plurality of rendering machines continuously operate to feed the edge server(s) and the number of channels used is such that allows for sufficient redundancy as well as for the faster than real-time rendering that is necessary in the case of a need for failover.

12 Claims, 3 Drawing Sheets

(56) References Cited

U.S. PATENT DOCUMENTS

2011/0083037 A1* 4/2011 Bocharov ........... H04L 65/4069
714/4.11
2012/0072608 A1* 3/2012 Peters ................. H04L 67/1008
709/231

OTHER PUBLICATIONS

Bergen, et al., "A Unified Approach for Repairing Packet Loss and Accelerating Channel Changes in Multicast IPTV", Consumer Communications and Networking Conference, 2009, 6th IEEE, Jan. 10, 2009, pp. 1-6.
The European extended Search Report and Search Opinion, for European Application No. 19844880.5, dated Apr. 4, 2022, European Patent Office (EPO), Munich, Germany.

* cited by examiner

SYSTEM FOR MANAGEMENT OF A PLURALITY OF RENDERING MACHINES TO AVOID TRANSMISSION FAILURES

CROSS-REFERENCE TO RELATED APPLICATIONS

This Application is a continuation of International Patent Application No. PCT/IL2019/050862, filed Jul. 31, 2019, currently pending, which claims the benefit of of U.S. Provisional Application No. 62/712,991 filed on Aug. 1, 2018, the contents of which are hereby incorporated by reference.

TECHNICAL FIELD

The disclosure relates to rendering of content of video channels, and more particularly to failover techniques for sustaining rendering of a video channel upon failure of a renderer.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

Transmitting video over the internet is becoming prevalent, quickly replacing other means of video delivery. Such video is provided in video clips, which tend to be short by nature, but also in full length movies and programming. Moreover, real-time channels are also provided using the streaming capabilities of the Internet and worldwide web. Typically such delivery makes use of a plurality of rendering machines (also referred to herein as renderers), the rendering machines taking the video content and creating group of pictures (GOPs) which is a video coding that specified the order in which inter- and intra-frames are arranged. A GOP is referred to herein as a sequence of compressed images in a stream, which can be decoded independently of any other data (i.e., an independent subsequence).

When a channel is created it is processed on a rendering machine that renders the video content into GOPs and then sends these GOPs to an edge server which then transmits the GOPs over the network to their desired destinations. It is essential for a channel to have its GOPs continuously transmitted as any interruption will be noticed by the user viewing the video content. Therefore, in a typical prior art solution, a renderer attempts to continuously send GOPs to the edge server so it is not starved of content. The problem is when a renderer fails. It may be possible to have a renderer up and running but this takes time which is longer than can be afforded when viewing video content. Therefore, in a typical set up the system will have two renderers, one being the active renderer, i.e., the renderer that sends the GOPs to the edge server, and the other being a hot standby, rendering the GOPs but not delivering them, in lock-step with the first one, waiting for a failure of the active renderer. In case of a failure of the active renderer, the standby renderer's output stream is used instead of the main one's and replaces it as the active renderer from now on. One of skill in the art would readily appreciate that this solution is expensive as for each channel two renderers have to be available at all times both operative. In some embodiments mirror sites are provided to address such issues of failover at additional costs and complexity.

In view of the limitations of the prior art it would be advantageous to provide a comprehensive system solution that would overcome these deficiencies in an effective manner from perspective of overall performance, cost and efficiency.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a video delivery system that comprises: a system network for the video delivery system; a plurality of renderers communicatively connected to the system network; a delivery network for the video delivery system, the delivery network communicatively connected to at least a client; at least an edge server communicatively connected to the system network and further communicatively connected to the delivery network, the at least an edge server adapted to transfer video content from at least one of the plurality of renderers to the at least one client, and the at least an edge server further adapted to receive groups of pictures (GOPs) from a first renderer of the plurality of renders and switch to a second renderer of the plurality of renderers upon detection of a failure of the first renderer; and, a rendering management unit adapted to manage transfer of GOPs reception from the first renderer to the second renderer. The rendering management unit may be further adapted to: to select the second renderer from the plurality of renderers upon detection of the GOP reception failure; initiate the second renderer to send GOPs of the video content to the at least an edge server from the detection of GOP reception failure onwards; and, accelerate operation of the second renderer for a predetermined period of time so as to fill the buffer to the sufficient number of GOPs. The video delivery system may further comprise a buffer to accumulate therein a sufficient number of GOPs that allows a transfer from the first renderer to the second renderer without interruption of delivery of GOPs to the at least a client.

Certain embodiments disclosed herein include an edge server for uninterrupted delivery of video content to at least a client from at least a renderer of a plurality of renderers that comprises: an interface to a system network, wherein the system network is communicatively connected to the plurality of renderers; and, an interface to a delivery network, wherein the delivery network is communicatively connected to the at least a client; wherein the edge server is adapted to transfer video content from at least one of the plurality of renderers to the at least one client, and the at least an edge server further adapted to receive groups of pictures (GOPs) from a first renderer of the plurality of renders and switch to a second renderer of the plurality of renderers upon detection of a failure of the first renderer; and wherein a rendering management unit communicatively connected to the system network manages the transfer of GOPs reception from the first renderer to the second renderer. The rendering management unit may be further adapted to: to select the second renderer from the plurality of renderers upon detection of the GOP reception failure; initiate the second renderer to send GOPs of the video content to the at least an edge server from the detection of GOP reception failure onwards; and, accelerate operation of the second renderer for a predetermined period of time so as to fill the buffer to the sufficient number of GOPs.

Certain embodiments disclosed herein include a method for uninterrupted delivery of video content to at least a client from at least a renderer of a plurality of renderers by transfer of delivery of groups of pictures (GOPs) from a first renderer of the plurality of renderers to a second renderer of the plurality of renderers that comprises: ensuring a sufficient number of GOPs are present within a buffer of an edge server transferring GOPs from the first renderer to the at least a client; detecting a failure of delivery of GOPs from the first renderer to the edge server; initiating the second renderer to send GOPs to the edge server from the detection of GOP reception failure onwards; and, accelerating operation of the second renderer for a predetermined period of time so as to fill the buffer to the sufficient number of GOPs.

BRIEF DESCRIPTION OF THE DRAWINGS

The foregoing and other objects, features and advantages will become apparent and more readily appreciated from the following detailed description taken in conjunction with the accompanying drawings, in which.

DETAILED DESCRIPTION

Figure 1:
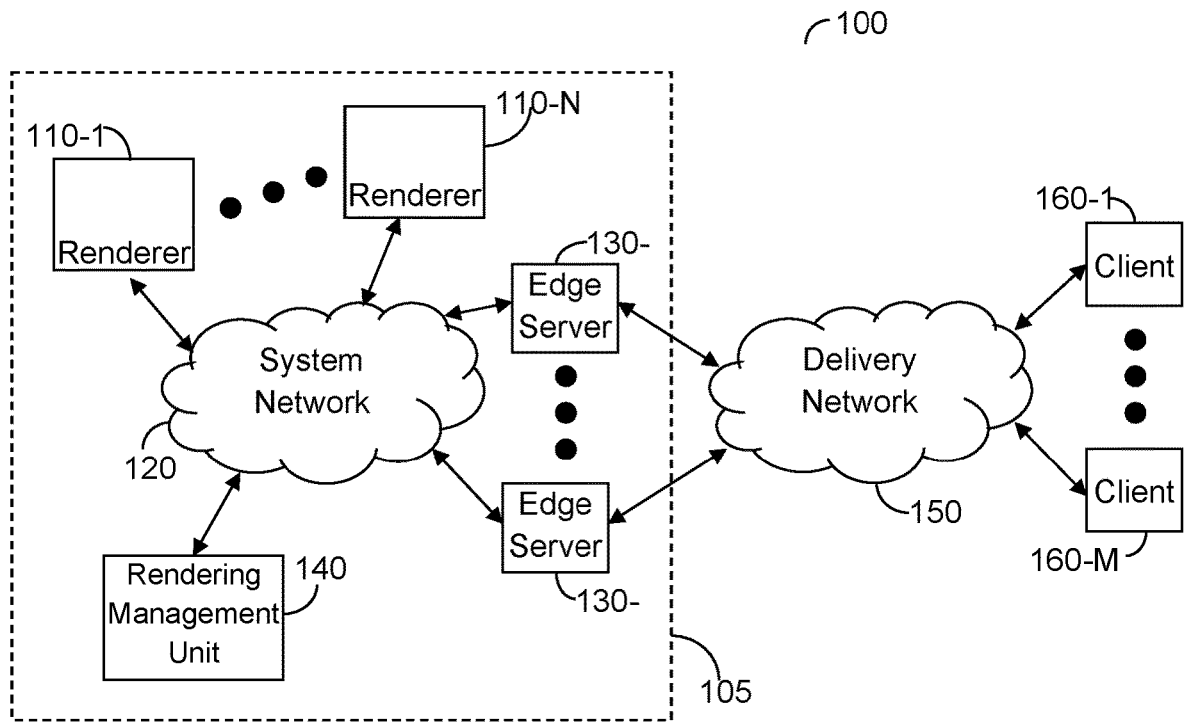
FIG. 1 is a schematic illustration of a system according to an embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

Reference is now made to FIG. 1 where an exemplary and non-limiting schematic illustration of a system 100 according to an embodiment is shown. The system comprises a video delivery system 105 that is connected to a delivery network 150. The delivery network may comprise, without limitations, the Internet, the worldwide web (WWW), local area network (LAN), wide area network (WAN), metro area network (MAN), wireless network, wired network, as well as the like, and any combination thereof. To the delivery network 150 there are connected one or more clients 160-1 through 160-M, where M is an integer equal to 1 or greater. Such clients 160 receive rendered video content from the delivery system 105 over the delivery network 150, according to the invention described in greater detail herein.

For the delivery system 105 to provide the video content a plurality of renderers 110, for example renderer 110-1 through 110-N, where N is an integer equal to 2 or greater, are used. Each renderer renders video content of one or more channels that are assigned to be rendered by a particular renderer 110, for example renderer 110-1. Internal to the system there is a system network 120 that connects between the components of the delivery system 105. The network 120, to which the renderers 110 are communicatively connected to, may comprise different ways of connecting the components of the delivery system 105. Such connectivity by the network 120 may include, but is not limited to, point-to-point connectivity, the Internet, the worldwide web (WWW), local area network (LAN), wide area network (WAN), metro area network (MAN), wireless network, wired network, as well as the like, and any combination thereof. One of ordinary skill in the art would readily appreciate that the delivery system 105 may be comprised from components connected in the cloud, i.e., components provided by a supplier and connected at the will of the designer and/or user of the delivery system 105, in part or in whole. The renderers 110 are connected through the system network 120 to one or more edge servers 130, for example edge servers 130-1 through 130-K, where K is an integer equal to 1 or greater.

An edge server, for example edge server 130-1, is served by a rendering machine, for example renderer 110-1, that supplies groups of pictures (GOPs). According to the invention the edge server 130-1 comprises a buffer, discussed in more detail with respect of FIG. 2) that is able a predetermined lead time over actual time. If a rendering machine fails, for example rendering machine 110-1, then the partially available GOP from that failing rendering machine 110 is discarded and another rendering machine, for example rendering machine 110-2, having the capacity to handle the GOPs stream, is used to provide the GOPs. The rendering machine 110-2 provides GOPS from the failed GOP onwards and rendering continues therefrom by the replacing rendering machine 110-2. Rendering initially at a faster than real-time speed it is possible to catch-up on time so that the edge server 130-1 receives the new GOPs from the new server, and continues to transmit the GOPs without interruption. A plurality of rendering machines 110 continuously operate to feed the edge server(s) 130 and the number of channels used on each renderer 110 is such that allows for sufficient redundancy as well as for the faster than real-time rendering that is necessary in the case of a need for failover. This process may be managed by a rendering management unit 140 that determines which channel is rendered on what rendering machine and handles the failover situation by transferring the rendering of a channel rendered on a first rendering machine, for example rendering machine 110-1, to another rendering machine, for example rendering machine 110-2. This is further explained in grater detail with respect of FIG. 3. One of ordinary skill in the art would readily appreciate that while the description herein the rendering management unit 140 is described as a separate component, it may be implemented in different other ways including, without limitations, on an edge server 130, or as a distributed rendering management unit 140 on multiple edge servers 130.

According to an embodiment the number (R) of renderers 110 in a system 105 is determined according to the following formula:

$$R = \text{Ceil}[(C*L)/P+S]$$

Where 'Ceil' means a round-up number of the calculation with the square brackets. 'C' is the number of channels to be handled by the system 105. I' is the per-channel expected load, provided in percent, and is preferably significantly smaller than 100%. CS' denotes the desired number of renderers the system 105 can sustain the loss of without losing functionality (i.e., one renderer or more). CP' is the maximum load in percent a renderer 110 is expected to continuously sustain. CR' is the number of renderers 110 that the system 105 will need in order to meet the constraints defined. It should be noted that this is a simplified version of the formula, assuming L is essentially constant over time and channels, and ignoring rounding issues with the division by P.

Figure 2:
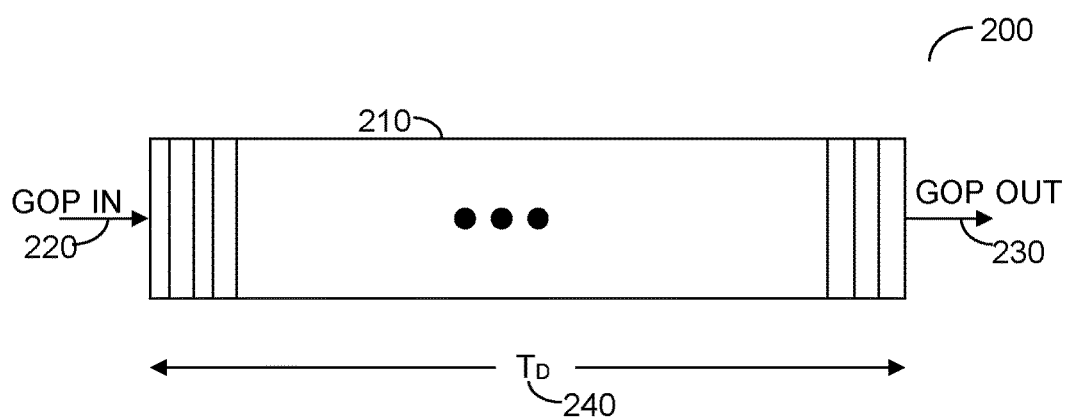
FIG. 2 is a schematic illustration of a buffer of a rendering management unit according to an embodiment.

According to a principle of the embodiment the edge server 130 comprises a GOP buffer. An exemplary and non-limiting GOP buffer is shown in FIG. 2. The GOP buffer 210 is capable of receiving GOPs 220 at its input and provide at its output GOPs 230. The buffer 210 is intended to contain therein a sufficient number of GOPs to provide at least a time period $T_D$ 240. Having a sufficiently large buffer at such a predetermined length allows for handling a failover process in case it is needed. That is, if a corrupt GOP is received the buffer is deep enough to provide valid GOPs while the delivery system 150 arranges for a different renderer 110 to take begin rendering GOPs from the corrupt GOP and onwards. The depth of the buffer to provide the necessary $T_D$ ensures a smooth rollover from one renderer to another without interruption of service by the edge server to the clients. That time may be used to switch to another renderer machine and causing it to render GOPs for the channel, typically at a higher rendering speed than the rendering speed necessary for the on-going operation of the system 105. The reason for that accelerated operation is that it allows the filling of the GOP buffer 210 so that if another failure happens the buffer is loaded to at least the minimum necessary to achieve a interruption less failover procedure. It should be noted that the accelerated operation may be performed for a predetermined period of time, until a time where the GOP buffer is filled beyond a predetermined minimum, or other filling schemes that allow the buffer to be sufficiently loaded with GOPs to allow for seamless failover transfer. According to the invention the failure may be a result a renderer 110 to fail to provide GOPs, the failure of a particular network to provide GOPs to the edge server 120, a situation where from the point of view of the edge server 120 GOPs cease to be received although still expected, receipt of a corrupt GOP by the edge server 120, receipt of an incomplete GOP by the edge server 120, not receiving GOPs from a renderer 110 by the edge server 120 for a predetermined period of time or longer, for example a much larger time than the usual inter-frame interval, and the like. All such cases may result in a need to invoke the failover process discussed herein.

Figure 3:
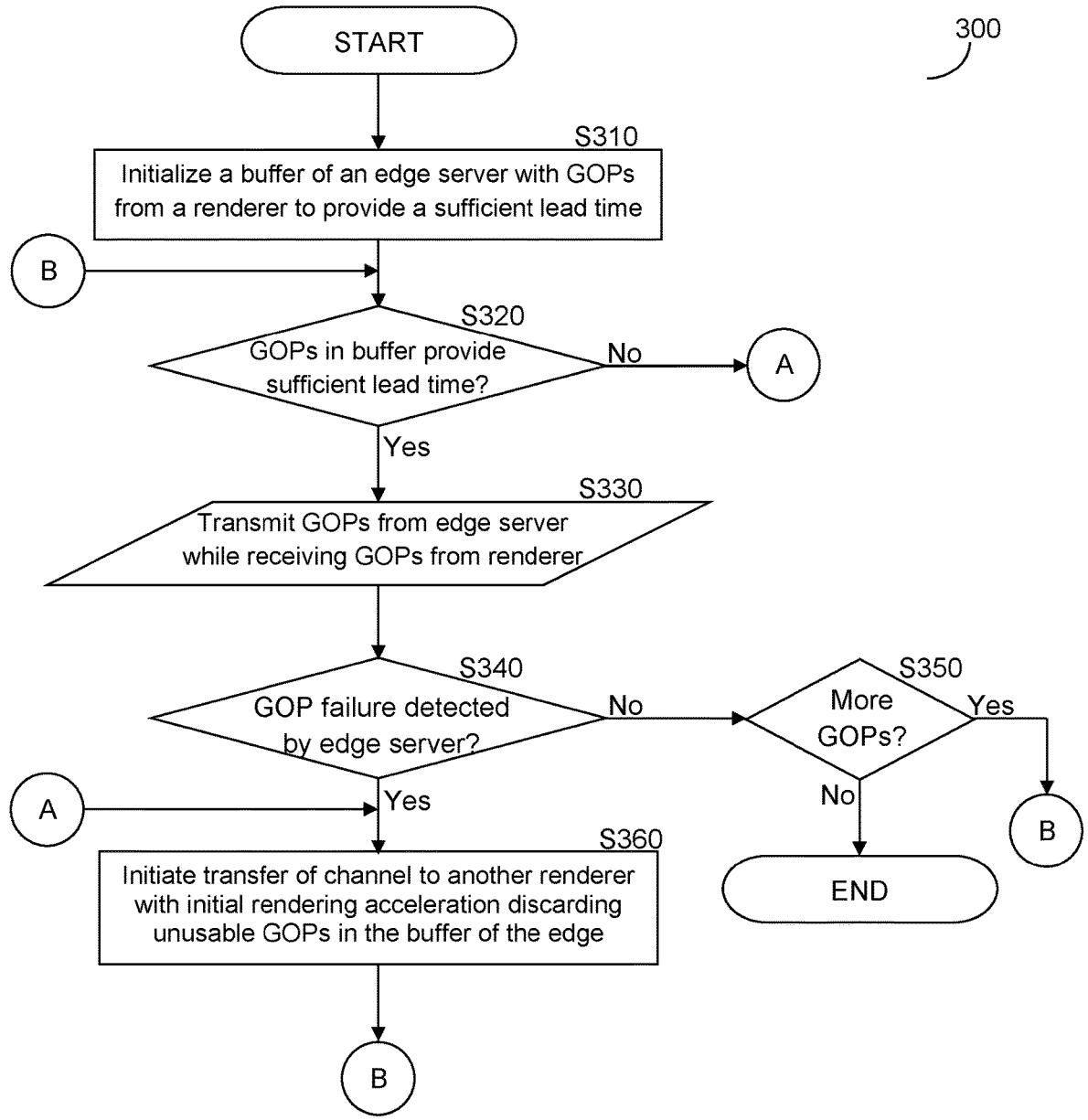
FIG. 3 is a schematic illustration of a flowchart describing the operation of the system according to an embodiment.

FIG. 3 is an exemplary and non-limiting schematic illustration of a flowchart 300 describing an operation of the system 105 according to an embodiment. In S310 a buffer of an edge server, for example GOP buffer 210 of an edge server 120, is initialized with GOPs. The buffer should be loaded with GOPs to at least provide a minimum lead-time of TD that will allow the transfer from one renderer to another according to the principles discussed herein. One of ordinary skill in the art would readily appreciate that initialization of the buffer, i.e., filling it with GOPs to the minimum required according to the invention, may be done in an accelerated speed versus the regular speed of feeding the buffer with GOPs. The advantage of doing so is that the time to begin transmission by the edge server is shortened. Once at least the minimum has been achieved the filling speed may be reduced to a rate the essentially corresponds to the depletion of GOPs from the buffer. In S320 it is checked whether the buffer has in it the necessary amount of GOPs to provide the minimum $T_D$ 240, to provide the failover sustainability discussed herein. If affirmative the execution continues with S330; otherwise, execution continues with S360 which begins a failover process. In S330 the edge server, for example edge server 130-1, begins to transmit GOPs from the output 230 of the buffer 210 while continuing to receive GOPs at its input 220. At S340 it is checked if the edge server 130-1 detected a failure related to GOPs and if so, execution continues with S360. As noted herein such failure includes but is not limited to: a renderer failure to provide GOPs, a failure of a network to provide GOPs to an edge server, a situation where from the point of view of an edge server GOPs cease to be received although still expected, receipt of a corrupt GOP by an edge server, receipt of an incomplete GOP by an edge server, not receiving GOPs from a renderer by an edge server for a predetermined period of time or longer, for example a much larger time than the usual inter-frame interval, and the like. If no failure was detected in S340 then execution continues with S350 where if no more GOPs need to be received by the edge server then execution terminates; otherwise, execution continues with S320. In S360 a transfer from one renderer, for example renderer 110-1, that has been determined to have failed in providing one or more GOPs, to another renderer, for example renderer 110-2, is initiated. The channel is moved for rendering by the other renderer 110-2 that is also set to accelerate rendering for the particular channel until the buffer 210 of the edge server is at least at its minimum requirement for seamless failover. The renderer 110-2 begins rendering from the point of failure so that the buffer 210 of the edge server 130-1 will be filled with missing GOPs. As may be necessary corrupted GOPs are discarded as they are replaced from the other renderer 110-2. Thereafter execution continues with S320. It should be noted that initially, the buffer gets depleted of GOPs, even below the minimum required, however, it gets filled back up beyond the minimum because of the initial accelerated operation of the renderer 110-2. One of ordinary knowledge in the art would now readily appreciate that the solution provides advantages over the prior art by allowing an efficient use of rendering resources while providing a seamless failover solution.

Figure 4:
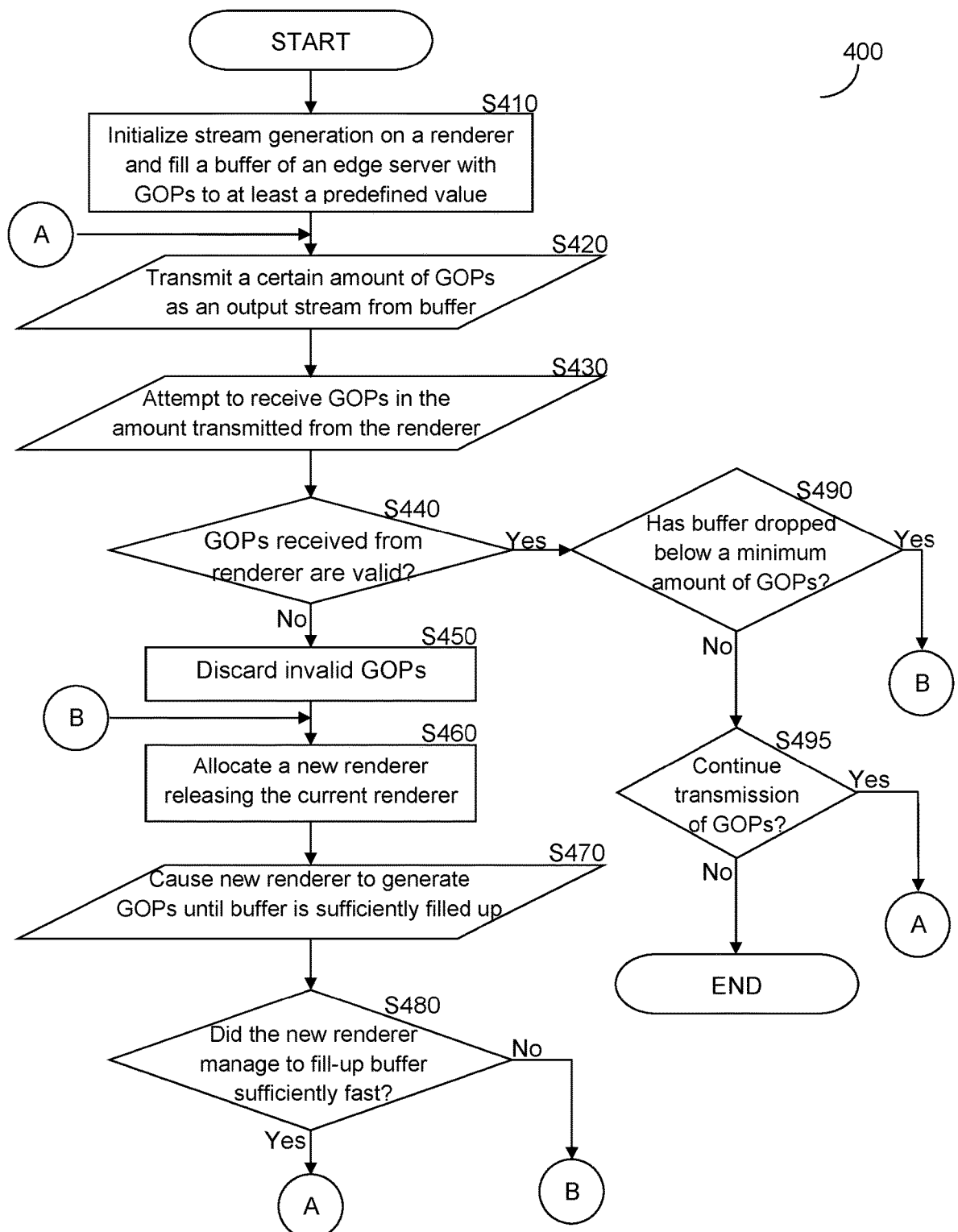
FIG. 4 is another schematic illustration of a flowchart describing the operation of the system according to an embodiment.

FIG. 4 is an exemplary and non-limiting schematic illustration of another flowchart 400 describing an operation of the system 105 according to an embodiment. In S410 a renderer 110, for example renderer 110-1, is initialized to provide a stream of GOPs to fill a buffer 200 of an edge server 130, for example, edge server 130-1. The purpose of the initialization is to load a sufficient amount of GOPs into the buffer 200 as explained in detail hereinabove. In S420 the buffer 200 begins to output GOPs from the buffer 200 so as to deliver the GOPs using the delivery network 150 to at least a client 160, for example client 160-1. In S430 an attempt is made to receive more GOPs from the renderer 110-1 in an amount compensating for at least the amount that was outputted in S420. In S440 it is checked whether the GOPs received from the renderer 110-1 are valid (or for that matter have been actually timely received, or any other check that may lead to a conclusion of faulty reception of GOPs from the designated renderer 110-1) and if not, execution continues with S450; otherwise, execution continues with S490. In S450 invalid GOPs are discarded, i.e., they are removed from the buffer 200 if they have been entered thereto. In S460 a new renderer 110 is allocated, for example renderer 110-2, and the current renderer 110-1 is released from the task of supplying GOPs to the buffer 200 of edge server 130-1. The release of a renderer may include, but is not limited to, shutting off the renderer, discarding the renderer, and any other action that causes the renderer 110-1 to cease supply of GOPs to the buffer 200 of the edge server 130-1. In S470 the new renderer 110-2 is signaled, or otherwise enabled, to begin generation of GOPs to be delivered to the buffer 200 of the edge server 130-1. Typically this is performed in an accelerated rate so as to pick up on lost time to refill the buffer 200 so that it may continue to uninterruptedly provide GOPs by the edge server 130-1 to clients 160. One of ordinary skill in the art would readily appreciate that the buffer 200 provides first valid GOPs still stored in the buffer 200 and supplied from the renderer 110-1 and thereafter GOPs that have been delivered to the buffer 200 by the renderer 110-2 that replaced the renderer 110-1. In S480 it is checked if the new renderer 110-2 was able to adequately fill the buffer 200, that is, to perform the acceleration loading of the buffer 200 at a desired rate and if so execution continues with S420; otherwise, execution continues with S460. In S490 it is checked whether the amount of GOPs in the buffer 200 of the edge server 130-1 has gone below a desired level of GOPs and if so execution continues with S460; Otherwise, execution continues with S495. In S495 it is checked whether more GOPs are to be delivered to the buffer 200 and if so execution continues with S420; Otherwise execution terminates. This may happen, for example but not by way of limitation, if it is desirable to cease operation of a particular channel that is transmitting GOPs.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A video delivery system, comprising:
  a system network for the video delivery system;
  a plurality of renderers communicatively connected to the system network;
  a delivery network for the video delivery system, the delivery network communicatively connected to at least a client;
  at least an edge server communicatively connected to the system network and further communicatively connected to the delivery network, the at least an edge server adapted to transfer video content from at least one of the plurality of renderers to the at least one client, and the at least an edge server further adapted to receive groups of pictures (GOPs) from a first renderer of the plurality of renders and switch to a second renderer of the plurality of renderers upon detection of a failure of the first renderer; and
  at least one processor; and at least one memory, the at least one memory containing instructions that, when executed by the at least one processor, configure the at least one processor to:
  manage transfer of GOPs reception from the first renderer to the second renderer; and
  initiate the second renderer to send the GOPs of the video content to the at least an edge server from the detection of GOP reception failure.

2. The video delivery system of claim 1, wherein the at least an edge server comprises:
  a buffer to accumulate therein a sufficient number of GOPs that allows a transfer from the first renderer to the second renderer without interruption of delivery of GOPs to the at least a client.

3. The video delivery system of claim 2, wherein the sufficient number of GOPs is a predetermined value of the video delivery system.

4. The video delivery system of claim 1, wherein the at least one processor is further configured to: select the second renderer from the plurality of renderers upon detection of the GOP reception failure.

5. The video delivery system of claim 4, wherein the at least one processor is further configured to: accelerate operation of the second renderer for a predetermined period of time so as to fill the buffer to the sufficient number of GOPs.

6. An edge server for uninterrupted delivery of video content to at least a client from at least a renderer of a plurality of renderers, the edge server comprises:
  an interface to a system network, wherein the system network is communicatively connected to the plurality of renderers;
  an interface to a delivery network, wherein the delivery network is communicatively connected to the at least a client;
  wherein the edge server is adapted to transfer video content from at least one of the plurality of renderers to the at least one client, and the at least an edge server further adapted to receive groups of pictures (GOPs) from a first renderer of the plurality of renders and switch to a second renderer of the plurality of renderers upon detection of a failure of the first renderer; and wherein a rendering management unit communicatively connected to the system network manages the transfer of GOPs reception from the first renderer to the second renderer, wherein the rendering management unit us further adapted to initiate the second renderer to send GOPs of the video content to the at least an edge server from the detection of a GOP reception failure.

7. The edge server of claim 6, further comprises:

a buffer to accumulate therein a sufficient number of GOPs that allows a transfer from the first renderer to the second renderer without interruption of delivery of GOPs to the at least a client.

8. The edge server of claim 7, wherein the sufficient number of GOPs is a predetermined value of the video delivery system.

9. The edge server of claim 6, wherein the rendering management unit is further adapted to select the second renderer from the plurality of renderers upon detection of the GOP reception failure.

10. The edge server of claim 9, wherein the rendering management unit is further adapted to accelerate operation of the second renderer for a predetermined period of time so as to fill the buffer to the sufficient number of GOPs.

11. A method for uninterrupted delivery of video content to at least a client from at least a renderer of a plurality of renderers by transfer of delivery of groups of pictures (GOPs) from a first renderer of the plurality of renderers to a second renderer of the plurality of renderers, the method comprises:

ensuring a sufficient number of GOPs are present within a buffer of an edge server transferring GOPs from the first renderer to the at least a client;

detecting a failure of delivery of GOPs from the first renderer to the edge server; selecting a second renderer from the plurality of renderers for the delivery of GOPs to the edge server;

initiating the second renderer to send GOPs to the edge server from the detection of GOP reception failure onwards; and accelerating operation of the second renderer for a predetermined period of time so as to fill the buffer to the sufficient number of GOPs.

12. The method of claim 11, wherein the sufficient number of GOPs is a predetermined value of the video delivery system.

* * * * *